(12) United States Patent
Gaumet

(10) Patent No.: US 6,278,107 B1
(45) Date of Patent: Aug. 21, 2001

(54) OPTICAL READER FOR A HIGH-RESOLUTION OPTICAL CODER

(75) Inventor: Daniel Gaumet, Champagnat (FR)

(73) Assignee: Codechamp, Champagnat (FR)

( * ) Notice: Subject to any disclaimer, the term of this patent is extended or adjusted under 35 U.S.C. 154(b) by 0 days.

(21) Appl. No.: 09/327,565

(22) Filed: Jun. 8, 1999

(30) Foreign Application Priority Data

Jun. 10, 1998 (FR) .................................................. 98 07314

(51) Int. Cl.[7] .................................................. G01D 5/347
(52) U.S. Cl. .................................. 250/231.13; 250/231.14
(58) Field of Search .......................... 250/231.13, 231.14, 250/231.15, 231.17, 231.18, 237 G, 237 R, 231.11; 73/170.08, 170.09

(56) References Cited

U.S. PATENT DOCUMENTS

| | | | |
|---|---|---|---|
| 3,512,006 | * 5/1970 | Haller | 250/231.11 |
| 3,983,391 | 9/1976 | Clemons . | |
| 4,247,769 | * 1/1981 | Warner | 250/231.14 |
| 4,334,430 | * 6/1982 | Hansen et al. | 73/170.09 |

FOREIGN PATENT DOCUMENTS

| | | |
|---|---|---|
| 36 09 211 | 9/1987 | (DE) . |
| 1198517 | 7/1970 | (GB) . |
| 60-031016 | 2/1985 | (JP) . |
| WO 80/01416 | 7/1980 | (WO) . |

\* cited by examiner

*Primary Examiner*—John R. Lee
(74) *Attorney, Agent, or Firm*—Nixon & Vanderhye P.

(57) ABSTRACT

The present invention relates to an optical reader for a high-resolution optical coder. This optical reader for a high-resolution optical coder comprises emitting means (10) generating a light beam (22), means (11) detecting this beam, a disk (40) of which the angular position must be determined, reflecting means (21, 20) to deflect the beam (22) emitted by the emitting means (10) toward the detecting means (11), and means (30) diffracting the beam (22) located on the coder disk (40), and it is characterized in that the beam emitting means (10) and the detecting means (11) are situated in one plane (12) parallel to the coder disk (40) which is configured between the plane (12) containing the emitting means (10) and the detecting means (11) on one hand and on the other hand the reflecting means (20, 21), the reflecting means (20, 21) comprising at least two reflecting surfaces each subtending a given angle with the plane (12) containing the emitting means (10) and the detecting means (11), the emitting means (10) and the detecting means (11) being aligned along a radius of the disk (40).

11 Claims, 4 Drawing Sheets

OPTICAL READER FOR A HIGH-RESOLUTION OPTICAL CODER

BACKGROUND OF THE INVENTION

The present invention relates to an optical reader for a high-resolution optical coder used in particular to determine the angular position of one object relative to another.

Optical coders are known from the prior art which allow measuring the angular position of two objects that may be in relative motion by means of interferometry. Such a device is known from the European patent applications 262,349 and 419,701 in the form of a disk fitted along a peripheral annulus with angular graduations allowing to diffract in a first instance a light beam from a light source. Once diffracted, the light beam enters a prism deflecting it to a read-unit diametrically opposite the light source. Before reaching the read unit, the light beam again crosses the disk and is diffracted a second time by the angular graduation. The beam is also totally reflected on the prism's side faces, thereby producing interferences.

An optic pickup is further known from the French patent 2,666,145 and in particular acts as a speed detector or a position detector of a rotating or translating element. This pickup comprises a coding element fitted with reflecting surfaces of defined geometry and a transducer comprising an optical emitter and an optical detector. The speed of the coding element is sensed on account of the light-beam reflections on the particular surfaces of the coding element. These surfaces are bounded at least in part by a conical surface, that is a parabola, an ellipse or a hyperbola. Because of the manufacture of the coding element, this pickup requires high-accuracy machining ands thus entails large costs and high fragility.

SUMMARY OF THE INVENTION

Accordingly the objective of the present invention is to palliate the drawbacks of the prior art by means of an optical reader for a high-resolution optical coder simple in design and maintenance, where, without resort to interferometry, improvement is achieved in the accuracy of object location.

This objective is attained in that the optical reader of a high-resolution optical coder comprises means to emit a light beam and means to detect this light beam, a disk of which the angular position is to be determined, reflecting means to deviate the beam from the emitter and the diffraction means on the coding disk toward the detection means and in that it is characterized by the beam emitting and detecting means being situated in one plane which is parallel to the coder disk, this disk being situated between the plane containing the emitting and detecting means on one hand and on the other the reflecting means, these reflecting means comprising at least two reflecting surfaces each subtending a given angle with the plane containing the detecting and emitting means, where the emitting and detecting means are aligned along a disk radius.

In another feature of the invention, the angle subtended between the reflecting surfaces and the plane containing the emitting and detecting means is 45°.

In another feature of the invention, the emitting and detecting means are configured in such manner that the optical path of the light beam crosses the coder disk at least once and the diffraction means at least once.

In another feature of the invention, the reflecting surfaces consist of mirrors and/or prisms and/or of polished surfaces of a solid body.

In another feature of the invention, at least one reflecting surface is of a given, non-planar topology and preferably is selected from the concave shapes.

In another feature of the invention, the two reflecting surfaces are non-planar and designed so that the beam reflected by the second reflecting surface toward the detector shall be collimated.

In another feature of the invention, the beam-emitting means comprise at least one emitter each of which is associated with a detector constituting the light-beam detecting means.

In another feature of the invention, the light-beam emitting means and detecting means are configured in such a way that they are aligned along a geometric half-line apart from the disk's axis of symmetry.

In another feature of the invention, the light beam emitted by the emitter means is contained in a plane perpendicular to the plane containing the emitting and detecting means and the axis of symmetry of the coder disk.

In another feature of the invention, the diffraction means comprise a reticle stationary relative to the disk and comprising a diaphragm opposite the emitting means and one or more apertures opposite the detectors.

BRIEF DESCRIPTION OF THE DRAWINGS

Other features and advantages of the present invention are elucidated in the following description relating to the attached drawings.

DETAILED DESCRIPTION OF THE PREFERRED EMBODIMENTS

Figure 1A:
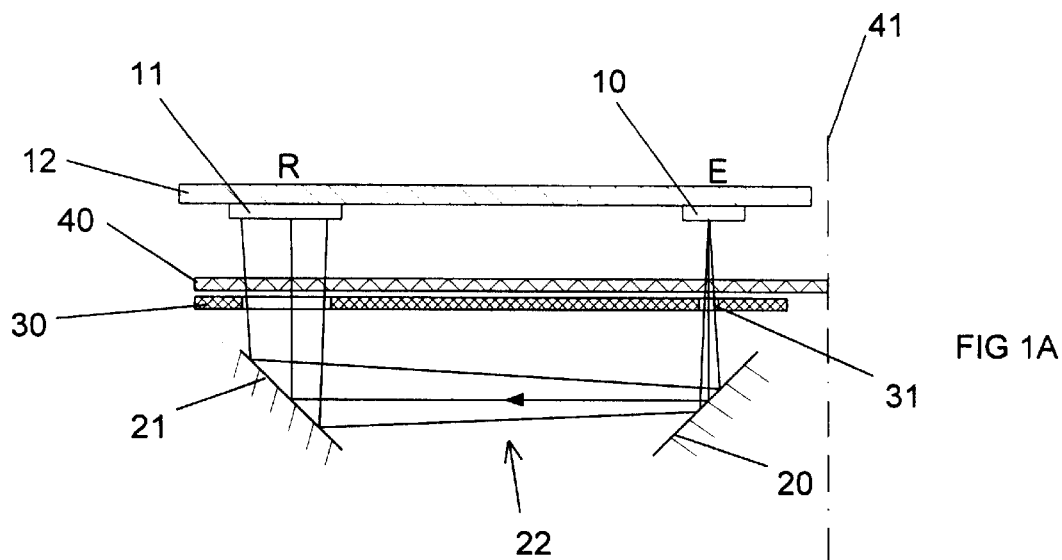
FIGS. 1A, 1B each show a sideview of embodiment variations of the optical reader of a high-resolution optical coder of the invention and the different configurations of disk and diffraction means relative to the emitting and detecting means, FIGS. 2A, 2B each show a sideview of the different embodiments of the reflecting-surface topologies, FIGS. 3A–3D each show a sideview of the different embodiments of the reflecting means.
Figure 1B:
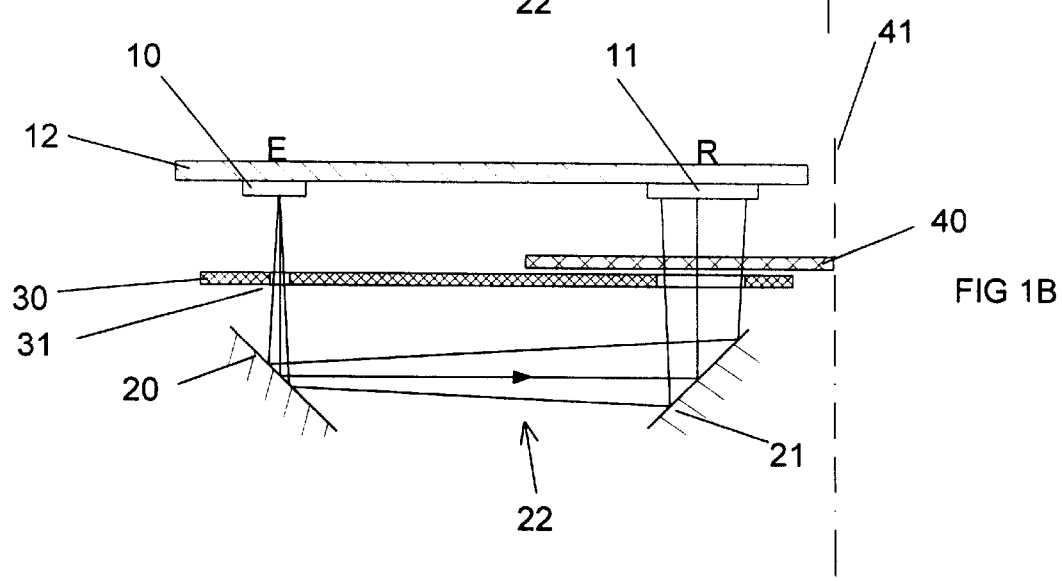

FIGS. 1A and 1B are sideviews of two embodiment variations of the optic coder of the invention and they show the different disk configurations and diffraction means. The optics of the optical coder of the invention is used to determine the angular coding position of a disk 40 relative to another, stationary object 12. For that purpose the optics comprises two elements known per se such as emitting means 10 generating a light beam 22, detecting means 11 for this beam 22, reflecting means 20, 21 and diffraction means 30 mounted on the coding disk 40. In FIGS. 1A and 1B, the emitting means 10 illustratively consist of an optical, illustratively electroluminescent emitter E, the detecting means 11 consist of a number of photodetectors R for instance, one photodetector corresponding to the number of tracks on the disk 40. In the invention, the optical emitter E and the optical detector R are configured in the same plane 12 perpendicular to the axis 41 of the disk 40 and are aligned on a radius of the coding disk 40. Advantageously the emitter E and detector R are aligned on a geometric half-line that does not intersect the disk axis of rotation 41. The distance between the emitter E and the axis of rotation 41 of the disk 40 can just as well be larger (FIG. 1B) or less (FIG. 1A) than the distance between the detector R and the axis of rotation 41 of the disk 40. In these designs, the disk 40 is parallel to the plane 12 containing the emitter E and the detector R.

Figure 5:
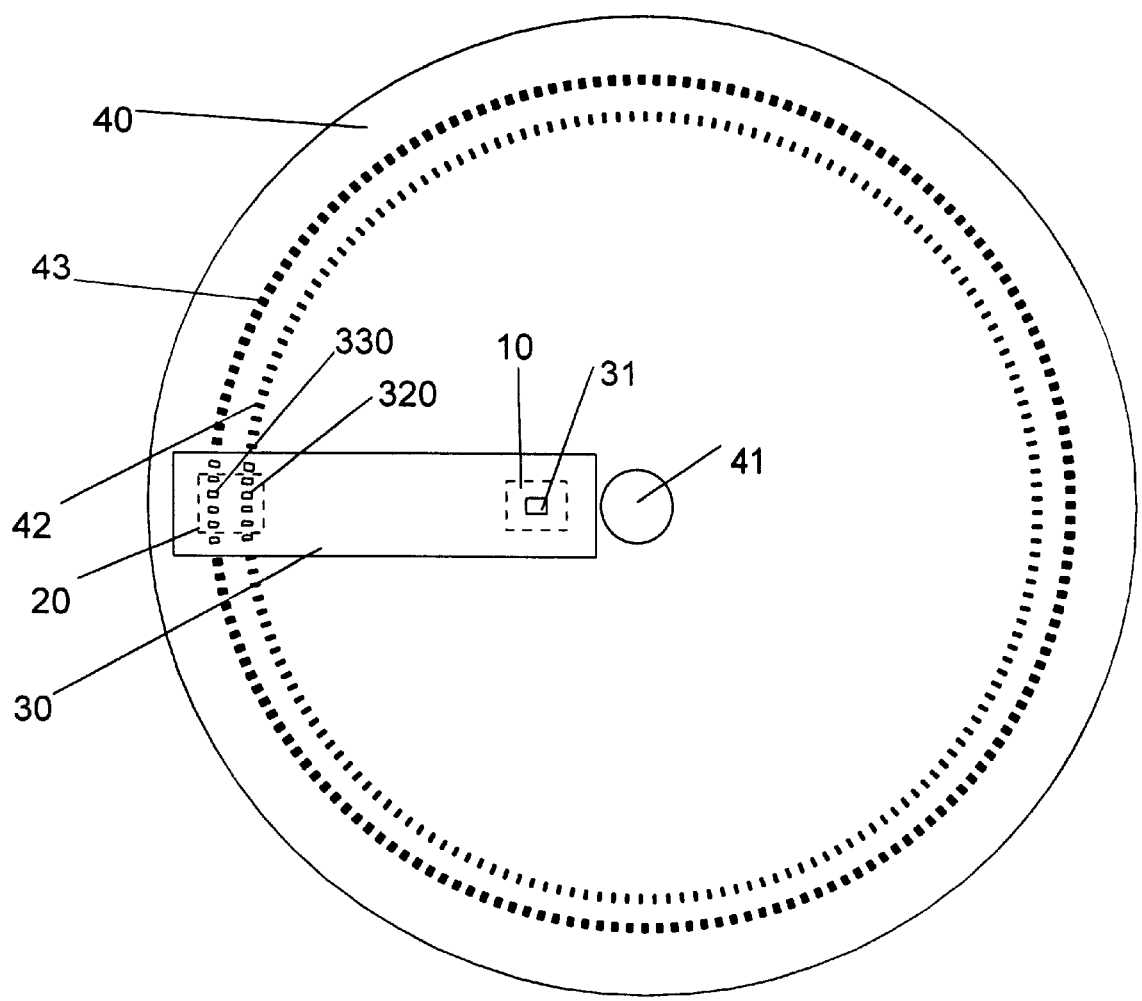
FIG. 5 is an underview of optical coding disk showing the diffraction means of the invention.

Illustratively the diffraction means 30 consists of a reticle 30 stationary relative to the coding disk 40 and mounted on the side of the disk 40 which is opposite the plane 12 containing the emitter E and the detector R. The optical coder of the invention furthermore comprises reflecting means 20, 21 to deflect the light beam 22. FIG. 5 elucidates the configuration of the various coder elements of the invention. The disk 40 comprises a plurality of tracks, for instance two, 42 and 43, which are composed of a sequence of graduations of which the sizes differ from one track to the other and/or which are shifted angularly. Each track 42, 43 consists of alternating translucent and opaque zones. The opaque reticle 30 is stationary relative to the disk 40 and illustratively is rectangular and runs parallel to the radius on which are aligned the coder's emitter E and detector R. Opposite the emitter E, the reticle 30 is fitted with a diaphragm 31. This diaphragm 31 limits stray peripheral beam reflections. The diaphragm 31 thereby improves the beam quality and enhances the resolution of the coder of the invention. Opposite the detector R, the reticle 30 is fitted with a set of apertures 320, 330 configured at the same pitch as the graduations 42, 43 of each coder track that are opposite the reticle apertures 320, 330. The reticle 30 may comprise as many sets of apertures 320, 330 as there are tracks on the coding disk 40.

The reflecting means 20, 21 comprise at least two surfaces 20, 21 configured in such a way that the disk 40 shall be situated between the plane 12 and these two reflecting surfaces 20, 21. A first surface 20 is situated opposite the emitter E and subtends a given angle with the plane 12. The second surface 21 is situated opposite the detector R and the coding tracks 42, 43 and is symmetrical with respect to an axis perpendicular to the plane 12 containing the emitter E and detector R. In this manner the beam 22 is first deflected by a first surface 20 toward the second surface 21 where it is deflected a second time toward the detector R. Illustratively the angle between the first surface 20 and the plane 12 is 45°. The two reflecting surfaces 20, 21 may be aligned with respect to a straight line parallel to the plane 12 containing the emitter E and detector R.

The beam 22 emitted by the emitting means 10 offers the feature of being contained in a plane which on one hand is perpendicular to the plane 12 containing the emitting means 10 and the detection means 11 and on the other hand contains the axis of rotation 41 of the disk 40. Advantageously the optical path of this beam 22 crosses the coding disk 40 at least once and the reticle 30 at least once.

FIG. 1B shows an embodiment variation wherein the optic path crosses the disk 40 once but the diffraction means 30 twice. For that purpose the reticle 30 extends beyond the surface subtended by the disk until it intersects the optical path segment between the emitter E and the first reflecting surface 20, the emitter E being installed a distance, away from the axis of rotation of the coding disk 40, larger than its radius. In this manner the optical path of the beam 22 crosses the reticle 30 a first time through the diaphragm 31 before being deflected by the first surface 20 and then crosses a second time the apertures 320, 330 of the reticle 30, then the tracks 42, 43 of the disk 40 following the deflection of the beam 22 by the second surface 21 toward the detector R.

FIG. 1A represents an embodiment variation wherein the optic path twice crosses the disk 40 and twice the diffraction means 30. For that purpose the dimensions of the disk 40 are such that all the disk surface is situated between the plane 12, containing the emitter E and detector R, and the reflecting surfaces 20, 21. The dimensions of the reticle 30 forming the diffraction means 30 are such that the reticle 30 covers at least an area bounded on one hand by the axis of rotation 41 of the disk 40 and on the other hand by the circumference of the disk 40. The optic beam path therefore crosses a first time the disk 40 through a blank track which is transparent and the diaphragm 31 of the reticle 30 before being deflected by the first surface 20, and then crosses a second time the reticle 30 through its apertures 320, 330 and then the tracks 42, 43 of the disk 40 following deviation of the beam 22 by the second surface 21 toward the detector R. Accordingly, as regards these two optic coder embodiment variations of the invention, the beam is deflected a first time by the first surface 20 for the purpose of directing the beam onto the second surface 21. The beam 22 then is deflected a second time by the second surface 21 to direct it onto the detector. As described above, the beam crosses the disk 40 at least once and the reticle 30 at least twice. The beam 22 is diffracted when crossing the reticle 30. This diffraction is then detected and measured by the detector at the end of the optic path, making it henceforth possible to determine, for instance, the angular position of the disk 40 relative to the plane 12 containing the emitter E and detector R.

Figure 2A:
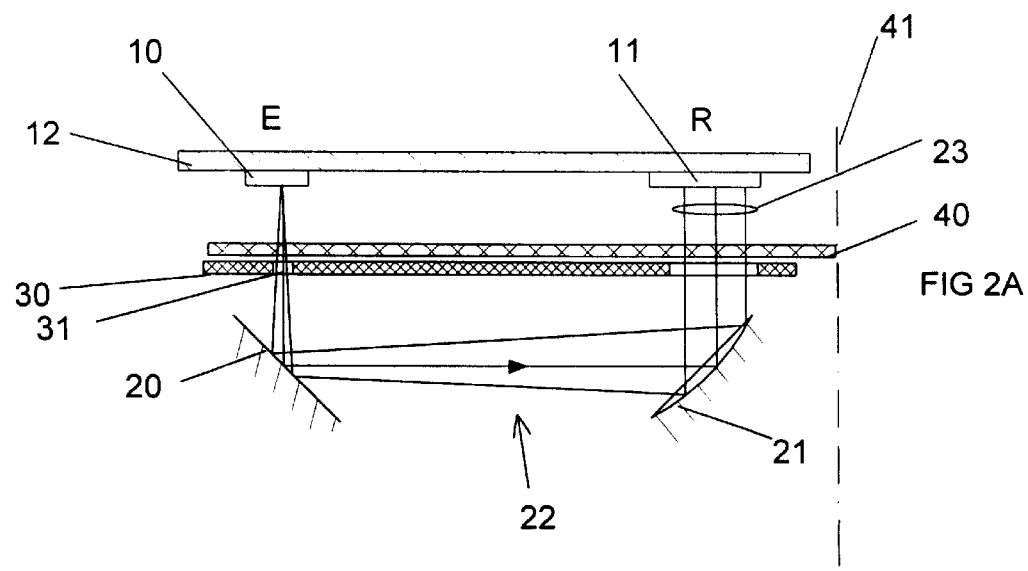
Figure 2B:
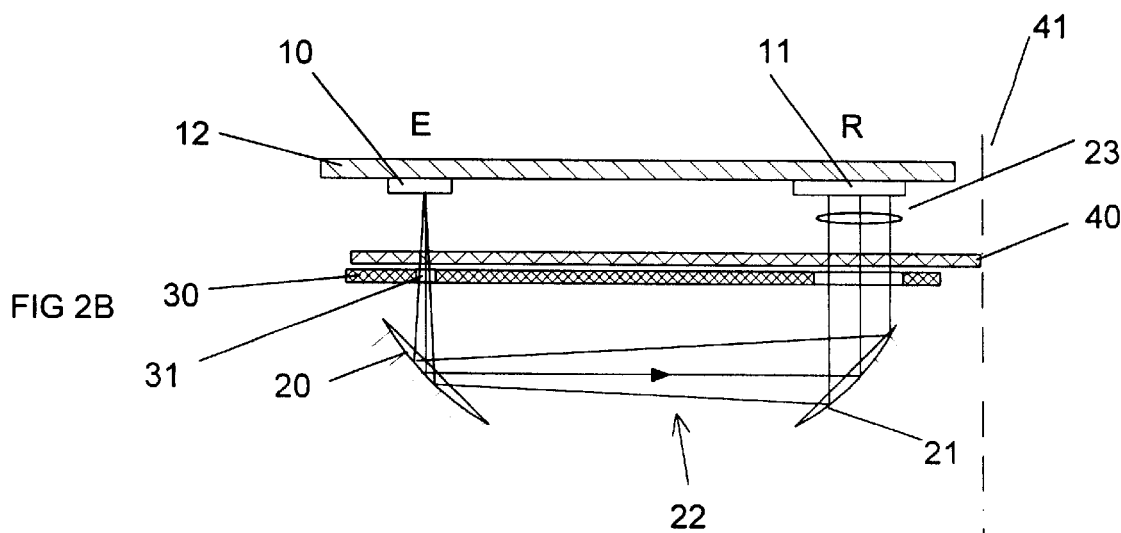

FIGS. 2A and 2B are sideviews of different embodiments of the topology of the reflecting surfaces. In FIGS. 2A and 2B, the emitting means 10 illustratively consist of an emitter E and the detector means 11 consist of a detector R. To simplify readout of FIGS. 2A and 2B, the disk and the diffraction means are configured in the manner of the embodiment variation of FIG. 1A, however they also may be configured for instance in the manner of the embodiment variation of FIG. 1B with the coding disk 40 cutting only the beam 22 from the second reflection and directed to the detector(s) R. As described above, the optical coder of the invention comprises reflecting means 20, 21 constituted by reflecting surfaces 20, 21. The quality and the geometry of the surfaces 20, 21 determine the measurement accuracy of the position of the disk 30 subsequently to beam detection at the detector means 11. Illustratively at least one surface 20, 21 is non-planar. For instance FIG. 2B is an embodiment variation wherein the the first and second surfaces 20, 21 are concave. The concavities of these two surfaces make it possible to collimate a light beam 22 in its path segment 23 between the second surface 21 and the detector R. FIG. 2A shows an embodiment variation wherein only the second surface 21 is concave in a manner selected to allow collimating a light beam directed at the detector R. Collimating a light beam directed at the coder detector R of the invention allows greater measurement accuracy of the angular position 40 relative to the plane 12 containing the emitting means 10 and the detecting means 11.

FIGS. 3A through 3D are sideviews of different embodiment variations of the detecting means. In order to simplify the readout in the FIGS. 3A through 3C, the disk and the diffraction means are configured as in the embodiment variation of FIG. 1A, however they also may be configured for instance in the manner shown in FIG. 1B wherein the coding disk 40 cuts only the beam 22 from the second reflection and directed at the detector(s) R.

Figure 3A:
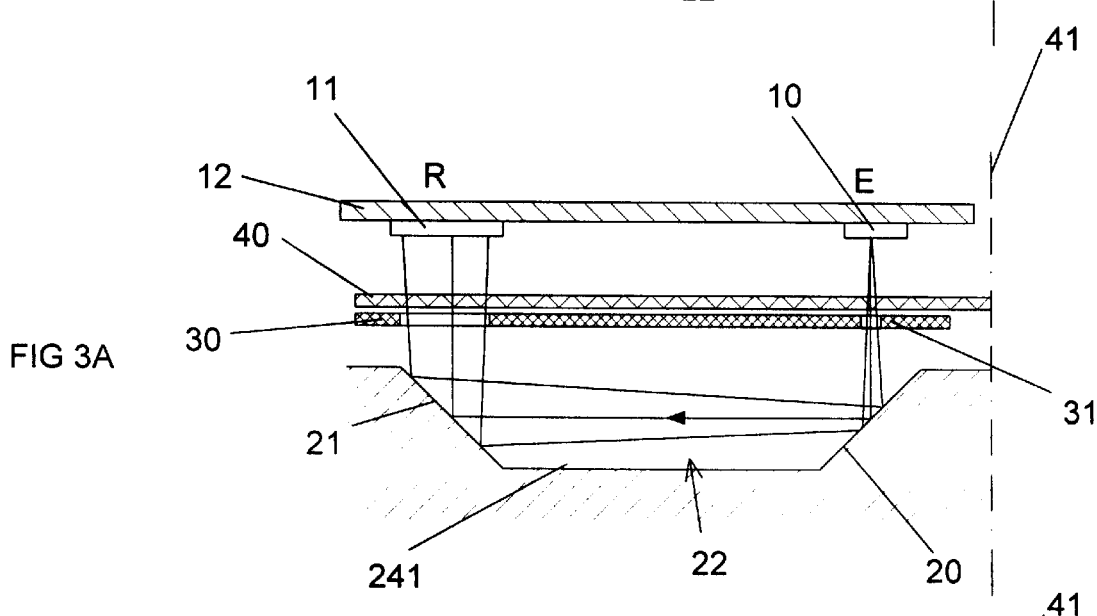

In the first embodiment variation shown in FIG. 3A, the reflecting surfaces 20, 21 are topologies of a solid body 24 fitted with a cavity 241. Advantageously the cross-section of this cavity 241 is a trapezoid of which the opposite, non-parallel sides constitute the first and second reflecting surfaces 20, 21. These reflecting surfaces 20, 21 illustratively are made so by polishing the solid.

Figure 3B:
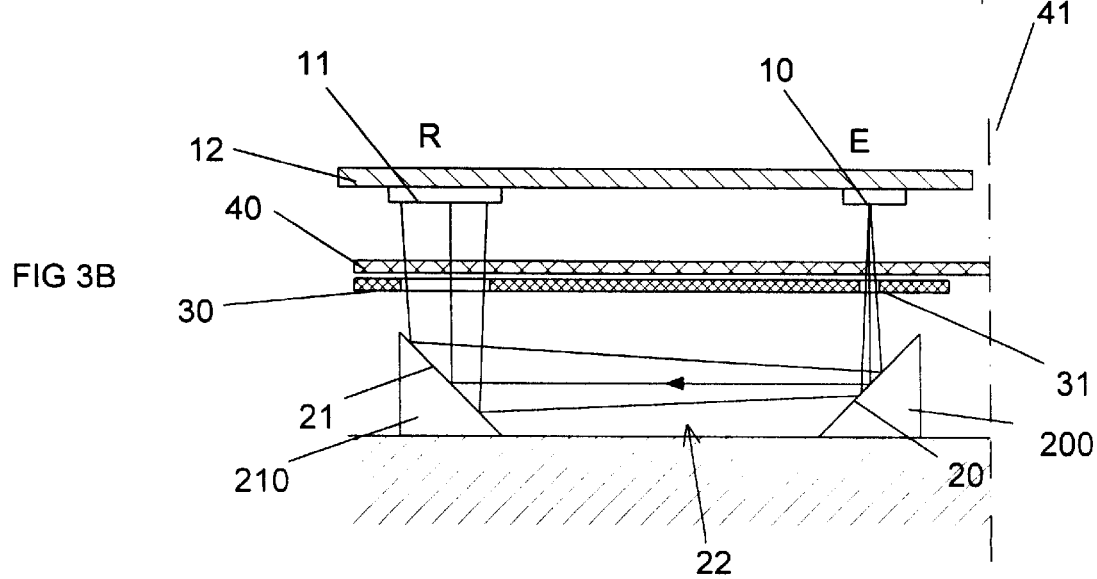

As regards the second embodiment variation shown in FIG. 3B, the reflecting means 210, 200 consist of two identical prisms 210, 200 of which the cross-sections are right isosceles triangles. The first and second prisms 200 and 210 resp. are configured oppositely the emitter E and the detector R whereby the surfaces of the outer sides of the first and second prisms 200 and 210 generated by the hypothenuses of the triangles constituting the cross-sections of the prisms 200, 210 shall constitute the resp. first and second reflecting surfaces 20, 21. The index of refraction of the prisms 200, 210 is selected to reflect the incident beam 22 on the reflecting surfaces 20, 21.

Figure 3C:
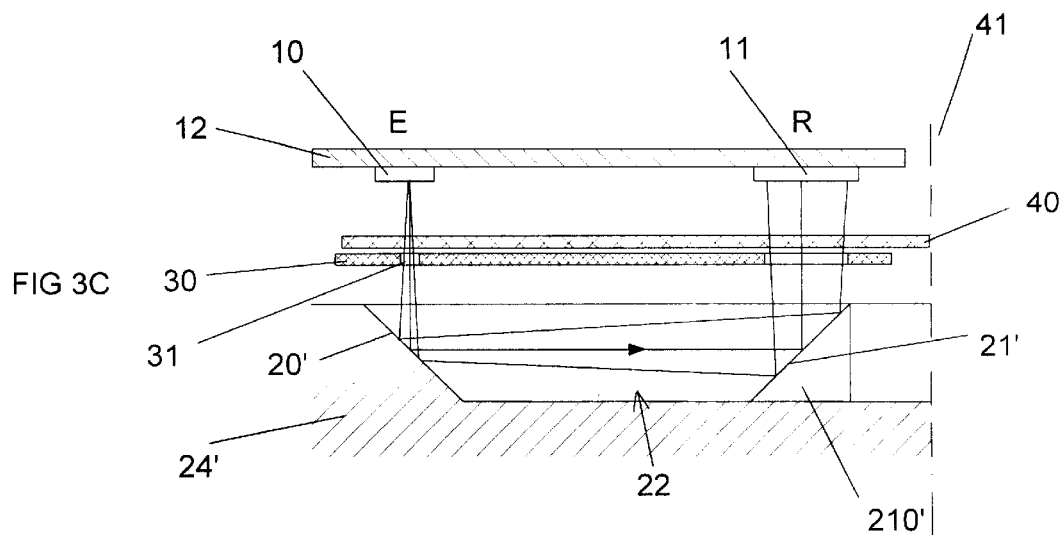

The third embodiment variation shown in FIG. 3C is a combination of the variants shown in FIGS. 3A and 3B. In this latter embodiment variation, the first reflecting surface 20' illustratively is fashioned in a solid body 24 similarly to the case of the reflecting surfaces 20, 21 of FIG. 3A. The second reflecting surface 21' is implemented using a prism 210' identical with the prisms used in the second embodiment variation and also configured in the same way.

Figure 3D:
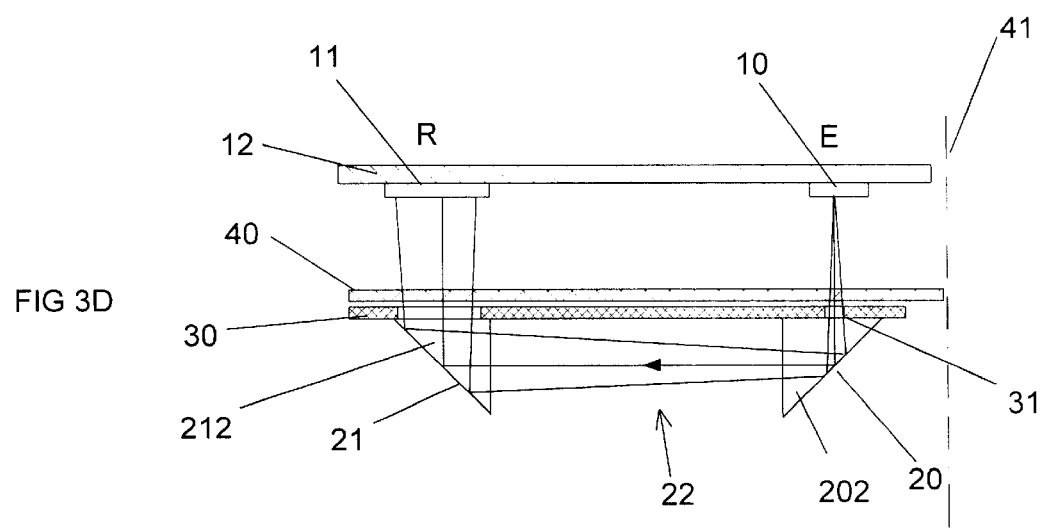

As regards the fourth embodiment variation shown in FIG. 3D, the reflecting means consist of prisms 202,212 of which the geometry is identical with that of the prisms 200, 210 of the second embodiment variation shown in FIG. 3B. On the other hand, the configuration of the prisms 202, 212 is different. In this fourth embodiment variation, the two prisms are configured in such manner that the inside surfaces of the faces of the first and second prisms 202, 212 resp. generated by the hypothenuses of the triangles forming the cross-sections of the prisms 202, 212 constitute the first and second reflecting surfaces 20, 21. In this fourth embodiment variation, the beam 22 emitted by emitter E enters the first prism 202 before being deflected toward the second prisms 212 by the first reflecting surface 20 consisting of the inner surface of the face of the first prism 202 generated by the hypothenuses of triangles forming the cross-section of the first prism 202. Thereupon the beam 22 enters the second prism 212 before being deflected to the detector R by the second reflecting surface 21 constituted by the inner surface of the face of the second prism 212 generated by the hypothenuses of the triangles forming the cross-section of the second prism 212.

Figure 4:
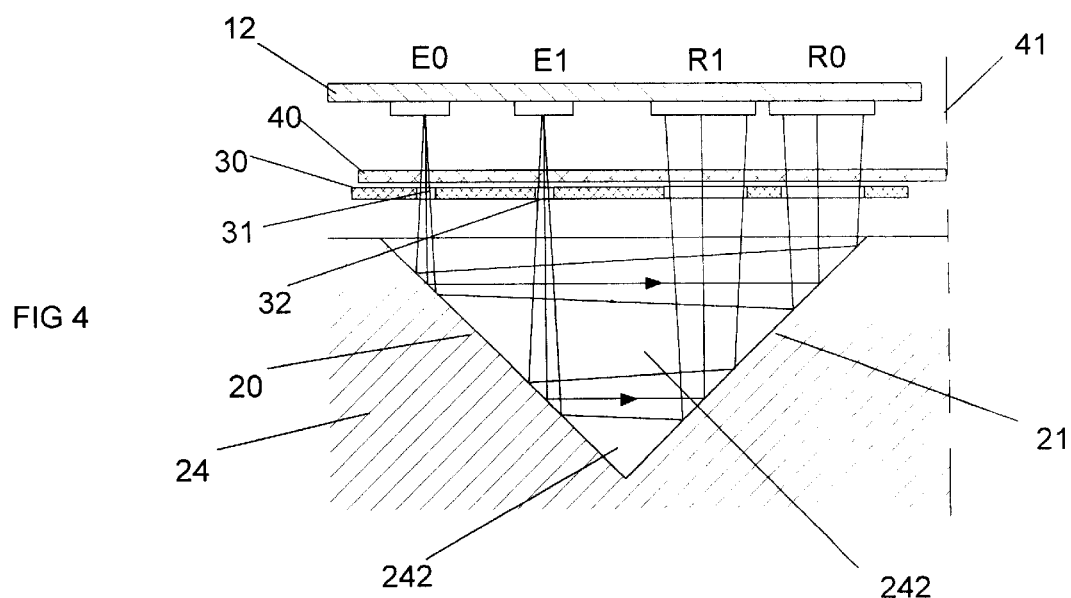
FIG. 4 is a sideview of an embodiment variation of the apparatus of the invention.

FIG. 4 is a sideview of an embodiment variation of the optical coder of the invention. In order to simplify this Figure, the disk and the means are configured in the manner of FIG. 1A though they also may be configured in the manner of the embodiment variation 1B wherein the coding disk 40 interrupts only the beam 22 from the second reflection and directed toward the detector(s) R.

In this embodiment variation, the mutual configuration of the means constituting the invention does not change, only the form of these means. In this embodiment, the transmitting means comprise a plurality of emitters, for instance two emitters $E_0$ and $E_1$. Each emitter $E_0$, $E_1$ resp. is associated with a detector $R_0$ and $R_1$ which are in radial alignment whereby the light beams emitted by the emitters $E_0$, $E_1$ are consecutively deflected by the first and second reflecting surfaces 20, 21 toward the detectors $R_0$ and $R_1$. The reflecting surfaces 20, 21 illustratively are fashioned in a solid body 24 comprising a cavity 242 of a specific shape. Advantageously the cross-section of the cavity 242 is a right isosceles triangle of which the two sides subtending a right angle constitute resp. the first and second reflecting surfaces 20, 21 of each emitter $E_0$, $E_1$, resp. of each detector $R_0$ $R_1$.

It is understood that the optical coder of the invention is designed to facilitate maintenance by arraying the emitting and transmitting means in one plane, thereby eliminating the need to disassemble the coder sub-assembly.

Obviously as well, any modifications within the ability of the expert are part of the present invention.

What is claimed is:

1. An optical reader for a high-resolution optic coder comprising an emitter (10) emitting a light beam (22), a detector (11) for detecting this beam, a coding disk (40) of which an angular position must be determined, reflectors for (21, 20) deflecting the beam (22) emitted by the emitter (10) toward the detector (11) and a defractor (30) for diffracting the beam located on the coding disk(40), wherein the emitter (10) and the detector (11) are situated in one plane (12) parallel to the coding disk (40) which is configured between the plane (12) containing the emitter (10) and the detector (11) on one side, and the reflectors (20, 21), on another side, the reflectors (20, 21) comprising at least two reflecting surfaces (20, 21) each subtending a given angle with said plane (12) containing the emitter (10) and the detector (11), a first one (20) of said reflecting surfaces being arranged for deflecting the light beam (22) towards a second one (21) of said reflecting surfaces, the emitter (10) and the detector (11) being aligned along a half-line parallel to a radius of the coding disk (40).

2. Optical reader as claimed in claim 1, wherein the angle subtended by the reflecting surfaces (20, 21) and the plane containing the emitter (10) and the detector ( 11) is 45°.

3. Optical reader as claimed in claim 1, wherein the emitter (10) and the detector (11) are configured in such a manner that an optic path of the light beam (22) crosses at least once the coding disk (40) and at least once the defractor (30).

4. Optical reader as claimed in claim 1, wherein the reflecting surfaces (20, 21) are mirrors and/or prisms and/or polished surfaces of a solid body.

5. Optical reader as claimed in claim 1, wherein at least one reflecting surface is of a given, non-planar topology selected from the concave shapes.

6. Optical reader as claimed in claim 5, wherein the two reflecting surfaces are non-planar and designed to collimate the light beam reflected by the second reflecting surface toward the detector.

7. Optical reader as claimed in claim 1, wherein the emitter (10) of the light beam (22) includes at least one optical emitter E, each optical emitter E being associated with an optical reader R constituting the detector (11) of the light beam (22).

8. Optical reader as claimed in claim 1, wherein said coding disk (40) has an axis of rotation (41), the emitter (10) and the detector (11) of the light beam (22) are configured in such manner that they are aligned along a half line not intersecting the axis of rotation (41) of the coding disk (40).

9. Optical reader as claimed in claim 1, wherein the light beam (22) emitted by the emitter (10) is contained in a plane perpendicular to the plane (12) containing the emitter (10), the detector (11) and the axis of symmetry (41) of the coding disk (40).

10. Optical reader as claimed in claim 1, wherein the defractor (30) includes a reticle stationary relative to the coding disk (40) and a diaphragm (31) opposite the emitter (10) and at least one aperture opposite the detector.

11. Optical reader as claimed in claim 1, wherein the emitter (10) and the detector (11) are configured in such a manner that the optical path of the light beam (22) crosses at least two times one of the items of the group consisting of the coding disk (40) and the defractor (30).

* * * * *